US012739958B1

(12) United States Patent
Fang et al.

(10) Patent No.: US 12,739,958 B1
(45) Date of Patent: Sep. 15, 2026

(54) MAGIC REMOTE CONTROL FOR LAMP

(71) Applicant: Changzhou Jutai Electronic Co., Ltd., Changzhou (CN)

(72) Inventors: Min Fang, Changzhou (CN); Shuhan Zhao, Changzhou (CN); Wei Huang, Changzhou (CN); Chengqian Pan, Changzhou (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 0 days.

(21) Appl. No.: 19/530,797

(22) Filed: Feb. 5, 2026

(30) Foreign Application Priority Data

Jan. 18, 2026 (CN) ........................ 202620060201.9

(51) Int. Cl.
*G08B 7/04* (2006.01)
*H05B 47/195* (2020.01)

(52) U.S. Cl.
CPC .................................. *H05B 47/195* (2020.01)

(58) Field of Classification Search
CPC .. F21S 10/046; F21S 6/001; F21S 9/02; F21S 10/04; F21S 10/043; H05B 47/105; H05B 47/12; H05B 47/19; H05B 45/10; H05B 45/20; H05B 47/195; H05B 47/196; H05B 47/1965; H05B 47/197; F21W 2121/00; F21Y 2115/10; Y02B 20/40
USPC ...... 340/815.72, 815.6, 815.4, 815.49, 384.1
See application file for complete search history.

(56) References Cited

U.S. PATENT DOCUMENTS

| | | | | |
|---|---|---|---|---|
| 6,655,817 B2 * | 12/2003 | Devlin | H05B 47/196 362/802 |
| 2005/0137720 A1 * | 6/2005 | Spira | H05B 47/195 700/20 |
| 2010/0134308 A1 * | 6/2010 | Barnardo | G06F 3/0346 340/8.1 |
| 2014/0334648 A1 * | 11/2014 | Wang | H05B 47/12 315/186 |
| 2017/0307159 A1 * | 10/2017 | Li | H05B 47/19 |
| 2018/0324932 A1 * | 11/2018 | Yotsumoto | G06F 13/00 |
| 2021/0007202 A1 * | 1/2021 | Guo | G06F 3/165 |

* cited by examiner

*Primary Examiner* — Anh V La

(57) ABSTRACT

The present disclosure discloses a magic remote control for a lamp, the control circuit comprising a control unit and a signal transmission component, the power supply unit being connected to the control unit, the remote signal switch component being connected to the control unit, and the signal transmission component being connected to the control unit, wherein the control unit is configured to output a lamp operation mode change signal and an audio playback command after receiving a switch signal provided by the remote signal switch component; and further comprising an audio unit configured to play an audio according to the audio playback command from the control unit, the audio unit being connected to the control unit. This disclosure can enhance the enjoyment of use.

10 Claims, 5 Drawing Sheets

MAGIC REMOTE CONTROL FOR LAMP

CROSS-REFERENCE TO RELATED APPLICATION

This application claims priority from the Chinese patent application 2026200602019 filed Jan. 18, 2026, the content of which is incorporated herein in the entirety by reference.

TECHNICAL FIELD

The present disclosure relates to the technical field of illumination, more particularly to a magic remote control for a lamp.

BACKGROUND

Many decorative lights are installed at high positions (such as Christmas trees, wall tops, etc.), and their control usually requires the use of remote controls. However, conventional remote controls for decorative lights have limited functionality, and operations on these conventional remote controls can usually only change the lighting mode of the lights. Moreover, these conventional remote controls are generally rectangular, which are very ordinary. When using such remote controls, users can neither feel the novelty nor experience the fun.

SUMMARY

The present disclosure provides a magic remote control for a lamp, which can enhance the fun of usage.

A magic remote control for a lamp, comprising a shell, a circuit board a remote signal switch component and a power supply unit, the shell being formed with a first cavity, the circuit board being located inside the first cavity and fixed to the shell, the circuit board being provided with a control circuit, the control circuit comprising a control unit and a signal transmission component, the power supply unit being connected to the control unit, the remote signal switch component being connected to the control unit, and the signal transmission component being connected to the control unit, wherein the control unit is configured to output a lamp operation mode change signal and an audio playback command after receiving a switch signal provided by the remote signal switch component; and further comprising an audio unit configured to play an audio according to the audio playback command from the control unit, the audio unit being connected to the control unit. The following technical scheme is employed to address the above technical problems.

In the present disclosure, after an operation mode selection unit is first operated to enable a control unit to select a desired operation mode for controlling the lamp, the operation mode selection unit is operated again or a switch element is operated, where the operation mode selection unit or the switch element sends a switch signal to the control unit, the control unit outputs a switch signal to switch a current operation mode and meanwhile outputs an audio playback command to an audio unit, and the audio unit calls a stored audio to play, whereby outputting sound effects such as waving sound, magic spells and bell ringing from the magic remote control. This type of magic remote control not only looks like a magic stick, but also can change the lighting effect of the lamp and meanwhile generate corresponding sound effects during usage, allowing users to have a feeling of making magic and further enhancing the fun of using the remote control.

DETAILED DESCRIPTION OF THE EMBODIMENTS

The present disclosure is described below in further detail in conjunction with the drawings and specific embodiments.

Embodiment 1

Figure 1:
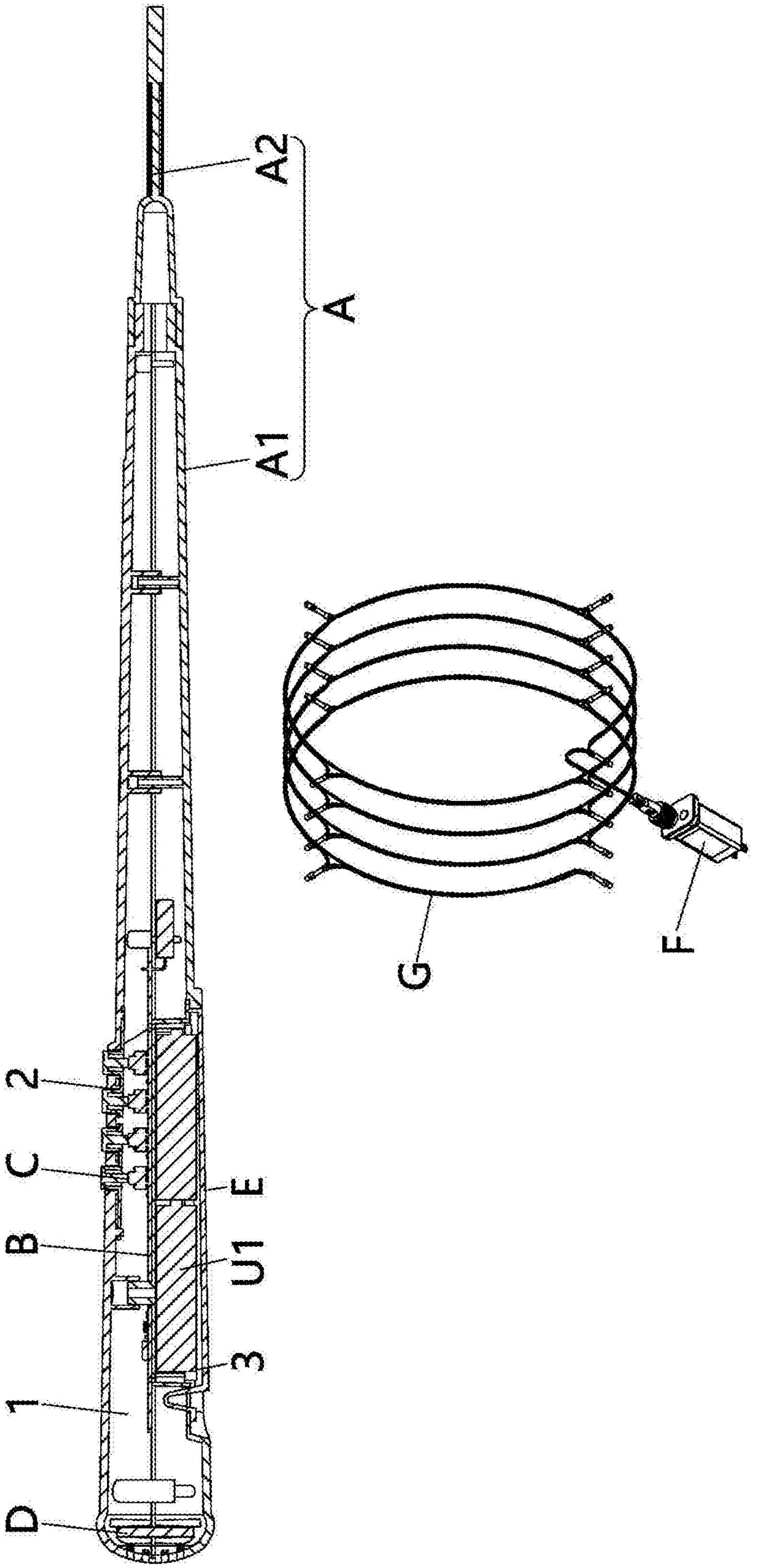
FIG. 1 is a diagram of a first magic remote control for a lamp and a lamp power source.
Figure 2:
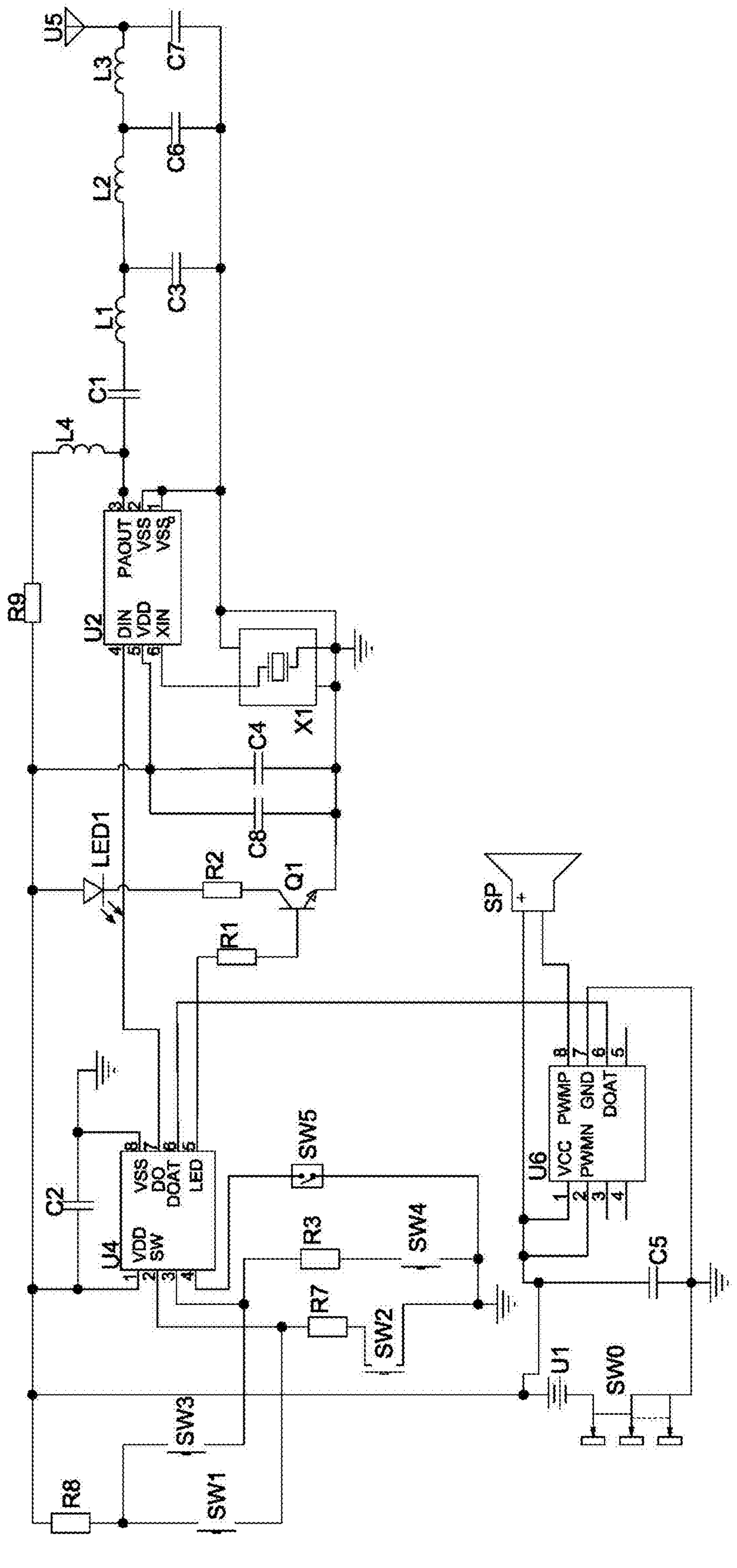
FIG. 2 is a schematic diagram of a first control circuit.

As shown in FIG. 1 to FIG. 2, the magic remote control for a lamp provided by the present disclosure includes a shell A, a circuit board B, a remote signal switch component C, a power supply unit and an audio unit D. The shell A is composed of a stick housing A1 and an ornament A2; and one end of the stick housing A1 is fixed to the ornament A2. The ornament A2 can employ stars, animal cartoons, flowers, etc., making the shell A look like a magic wand from the outside. The ornament A2 preferably is made of transparent materials. The shell A is stick shaped or rectangular, or of other shapes. The shell A is formed with a first cavity 1 and a first installation hole 2. The circuit board B is located inside the first cavity 1 and fixed to the shell A. The shell A further includes a cover plate E. The shell A is further formed with a second cavity 3; and the second cavity 3 preferably is formed on the stick housing A1. The power supply unit may include a storage battery U1, or may be composed of a USB interface and a charger. The USB interface is connected to the circuit board B; and the charger is connected to the USB interface. When it is needed to supply power, just connect the charger to a socket connected to the mains supply. In the present embodiment, the power supply unit preferably employs a storage battery, which is installed in the second cavity 3. The cover plate E fits with the second cavity 3 and is connected to the shell A, thereby limiting the storage battery into the second cavity 3. A positive electrode of the power supply unit is connected to one end of a fifth capacitor C5, while another end of the fifth capacitor C5 is grounded. A negative electrode of the power supply unit is connected to a control switch SW0 configured to control whether the power supply unit supplies power or not, while another end of the control switch SW0 is grounded. When the control switch SW0 is closed, the power supply unit can supply power to other components. When the control switch SW0 is disconnected, the whole magic remote control is out of power, hence cannot operate.

The magic remote control in the present embodiment is used in conjunction with a lamp power source F having a remote signal receiver. The structure of the lamp power source F is of an existing technology, for example, the lamp power source F employs a remote-controlled integrated power source having a radio signal receiver (such as a radio frequency remote signal receiver). Such power source includes a programmable controller, which generally employs a single-chip. The lamp G preferably employs LED lamp strings. The lamp G is connected to the lamp power source F. When receiving a signal sent from the magic remote control, the lamp power source F will control the lighting effect or status of the lamp G.

The circuit board B is provided with a control circuit, the control circuit including a control unit U4 and a signal transmission component. In the present embodiment, the power supply unit is connected to the remote signal switch component C, the control unit U4 and the signal transmission component respectively. The remote signal switch component C is connected to an input end of the control unit U4. The control unit U4 is configured to output a lamp operation mode change signal and an audio playback command after receiving a switch signal provided by the remote signal switch component C. The control unit U4 is a programmable control unit. In the present embodiment, the control unit U4 preferably employs a single-chip, which is inbuilt with multiple lamp control modes available for selection. The signal transmission component is connected to an output end of the control unit U4. The remote signal switch component C passes through the first installation hole 2 and fits with the first installation hole 2, and a portion of the remote signal switch component C is exposed out of the shell A.

In the present embodiment, the remote signal switch component C preferably is composed of an operation mode selection unit and a switch element SW5. The operation mode selection unit is configured to cooperate with the control unit U4 and enable the control unit U4 to select a lamp control mode and/or output a lamp operation state switch signal. The operation mode selection unit is connected to the control unit U4. When the operation mode selection unit selects an operation mode, the switch element SW5 cooperates with the control unit U4 and enables the control unit U4 to output a lamp operation state switch signal. One end of the switch element SW5 is connected to the control unit U4, while another end thereof is grounded. The switch element SW5 may employ a button switch or a vibration sensor. In the present embodiment, the switch element SW5 preferably employs a vibration sensor. The vibration sensor is configured to trigger its closing by sensing external vibrations through an internal mechanical structure. Its core part (such as spring or bead) is displaced upon vibration, whereby switching the circuit from a disconnected state to a closed state, generating a pulse signal. The vibration sensor is of an existing technology. By shaking or waving the magic remote control, the switch element SW5 can be closed, thereby switching the operation state of the lamp G. This type of operation mode is funnier for users than conventional remote controls.

The audio unit D is configured to play an audio according to the audio playback command from the control unit U4. The audio unit D is connected to the control unit U4. The audio unit includes an audio storage chip U6 and a speaker SP. The audio storage chip U6 is connected to the power supply unit. An input end (sixth pin) of the audio storage chip U6 is connected to an output end (sixth pin) of the control unit U4. The speaker SP is connected to the power supply unit, and the speaker SP is further connected to an output end (eighth pin) of the audio storage chip U6. A first pin of the speaker SP is connected to the positive electrode of the power supply unit. A second pin of the speaker SP is connected to the eighth pin of the audio storage chip U6. A seventh pin of the audio storage chip U6 is grounded. First and second pins of the audio storage chip U6 are connected to the positive electrode of the power supply unit.

After the operation mode selection unit is first operated to enable the control unit to select a desired operation mode for controlling the lamp, the operation mode selection unit is operated again or the switch element SW5 is operated, where the operation mode selection unit or the switch element SW5 sends a switch signal to the control unit U4, then the control unit U4 outputs a switch signal to switch a current operation mode and meanwhile outputs an audio playback command to the audio unit D, and the audio unit D calls the stored audio to play, whereby outputting sound effects such as waving sound, magic spells and bell ringing from the magic remote control. This type of magic remote control not only looks like a magic stick, but also can change the lighting effect of the lamp and meanwhile generate corresponding sound effects during usage, allowing users to have a feeling of making magic and further enhancing the fun of using the remote control. There is another way that: the operation mode selection unit cooperates with the control unit U4 and enables the control unit U4 to select a desired operation mode for controlling the lamp and meanwhile output a switch signal to switch a current operation mode.

The operation mode selection unit includes a first selection switch SW1 configured to cooperate with the control unit U4 and enable the control unit U4 to select a lamp On-Off switch mode and/or output a lamp On-Off switch command signal or output an operation stop signal. One end of the first selection switch SW1 is connected to the positive electrode of the power supply unit while another end thereof is connected to a second pin of the control unit U4. When the first selection switch SW1 is closed, it provides a high level to the second pin of the control unit U4. The first selection switch SW1 preferably employs a button switch, which is disconnected under normal conditions. When the first selection switch SW1 is pressed, it is in a closed state. When the first selection switch SW1 is unpressed, it restores to the disconnected state. The control unit U4 is a programmable control unit, which has multiple input ends; and each of the input ends can receive a high-level or low-level signal. The programmable control unit enables the control unit U4 to select an operation mode for controlling the lamp through the program built in the control unit U4 according to the signal received by each pin. For example, when a user makes the first selection switch SW1 temporarily closed for the first time, such as making the first selection switch SW1 closed for less than 1 second, the second pin of the control unit U4 receives a high level; in the case that the control unit U4 selects the lamp On-Off switch mode and if the lamp G is in an Off state initially, when the user makes the first selection switch SW1 connected for the second time or when the user shakes or waves the magic remote control for the first time to make the switch element SW5 (the switch element SW5 being a vibration sensor) closed, the control unit U4 outputs to the signal transmission component a command signal to keep the lamp G in a Constant-On state, then the signal transmission component sends the command signal to the lamp power source F, and the lamp power source F controls the lamp G to switch from the Off state to the Constant-On state. When the user makes the first selection switch SW1 connected for the third time or when the user shakes or waves the magic remote control for the second time to make the switch element SW5 closed, the control unit U4 outputs to the signal transmission component a signal to keep the lamp G in an Off state, then the signal transmission component sends the signal to the lamp power source F, and the lamp power source F controls the lamp G to switch from the Constant-On state to the Off state. In this way, after the first selection switch SW1 has been closed once, the switch element SW5 can be closed by shaking or waving the magic remote control, or the first selection switch SW1 can be pressed again to close, enabling the control unit U4 to output a control signal to keep the lamp G in a Constant-On or Off state. If the user operates to make the first selection switch SW1 closed for a long time, that is, long pressing, for example, making the first selection switch SW1 closed for more than 3 seconds, the control unit U4 selects to shut the signal output mode. Then, when the user shakes or waves the magic remote control to make the switch element SW5 (the switch element SW5 being a vibration sensor) closed, the control unit U4 cannot output a command to the signal transmission component, whereby the magic remote control is in a signal output shut state.

Another method for the first selection switch SW1 to cooperate with the control unit U4 is that: when the user makes the first selection switch SW1 temporarily closed for the first time, the control unit U4 selects the lamp On-Off switch mode and meanwhile outputs a lamp On-Off switch signal; if subsequently the user shakes or waves the magic remote control to make the switch element SW5 closed or makes the first selection switch SW1 temporarily closed again, the control unit U4 outputs a lamp On-Off switch signal.

Since there are multiple selection switches in the operation mode selection unit and the spacing between these selection switches is small, if multiple selection switches are pressed simultaneously during operation, short circuit can be caused. Therefore, the power supply unit further includes an eighth resistor R8. One end of the eighth resistor R8 is connected to the positive electrode of the storage battery U1, while another end thereof is connected to the first selection switch SW1. Through the eighth resistor R8, the short circuit caused by simultaneously pressing multiple selection switches can be avoided.

The operation mode selection unit further includes a third selection switch SW3 configured to cooperate with the control unit U4 and enable the control unit U4 to select a flashing switch mode and/or output a flashing switch signal. The third selection switch SW3 preferably employs a button switch, which has the same characteristics as the button switch employed by the first selection switch SW1. One end of the third selection switch SW3 is connected to the power supply unit while another end thereof is connected to a third pin of the control unit U4. When the third selection switch SW3 is closed, it provides a high level to the third pin of the control unit U4. Preferably, one end of the third selection switch SW3 is connected to another end of the eighth resistor R8 in the power supply unit.

The flashing mode of the lamp G refers that the lamp G generates different flashing effects when obtaining signals of different duty cycles during operation. When the user makes the third selection switch SW3 closed for the first time, the third pin of the control unit U4 receives a high level; in the case that the control unit U4 selects the lamp flashing switch mode, when the user makes the third selection switch SW3 connected for the second time or when the user shakes or waves the magic remote control for the first time to make the switch element SW5 closed, the control unit U4 outputs to the signal transmission component a command signal to keep the lamp in a first flashing mode, then the signal transmission component sends the command signal to the lamp power source F, and the lamp power source F controls the lamp G to remain in an operation state of the first flashing mode. When the user makes the third selection switch SW3 connected for the third time or when the user shakes or waves the magic remote control for the second time to make the switch element SW5 closed, the control unit U4 outputs to the signal transmission component a command signal to keep the lamp in a second flashing mode, then the signal transmission component sends the command signal to the lamp power source F, and the lamp power source F controls the lamp G to remain in an operation state of the second flashing mode. Supposing there are eight flashing modes in the lamp power source F, after the third selection switch SW3 has been closed for the first time, every time the third selection switch SW3 is closed again or every time the user shakes or waves the magic remote control, the lamp power source F will control the lamp G to change the flashing effect once, allowing cyclic switching between eight flashing modes.

Another method for the third selection switch SW3 to cooperate with the control unit U4 is that: when the user makes the third selection switch SW3 closed for the first time, the control unit U4 selects the lamp flashing switch mode and meanwhile outputs a lamp flashing effect switch signal; after the control unit U4 selects the lamp flashing switch mode, if subsequently the user shakes or waves the magic remote control to make the switch element SW5 closed or makes the third selection switch SW3 closed again, the control unit U4 outputs a lamp flashing effect switch signal.

The operation mode selection unit further includes a second selection switch SW2 configured to cooperate with the control unit U4 and enable the control unit U4 to select a timing switch mode and/or output a timing switch signal. The second selection switch SW2 preferably employs a button switch, which has the same characteristics as the button switch employed by the first selection switch SW1. One end of the second selection switch SW2 is connected to a second pin of the control unit U4, while another end thereof is grounded. When the second selection switch SW2 is closed, a low level is generated at the second pin of the control unit U4. To avoid short circuit caused by pressing of other selection switches while pressing the second selection switch SW2, preferably, a seventh resistor R7 is connected between one end of the second selection switch SW2 and the second pin of the control unit U4.

When the second selection switch SW2 is pressed for the first time to be connected, the control unit U4 receives a signal sent by the second selection switch SW2 and selects the timing switch mode. If the user makes the second selection switch SW2 connected for the second time or when the user shakes or waves the magic remote control for the first time to make the switch element SW5 closed, the control unit U4 outputs to the signal transmission component a command signal to let the lamp enter a timing operation mode, then the signal transmission component sends the command signal to the lamp power source F, and the lamp power source F controls the state of lamp G in the timing operation mode, for example, turning on for 8 consecutive hours and turning off for 16 hours. When the second selection switch SW2 is pressed for the third time to be connected, when the user shakes or waves the magic remote control for the second time to make the switch element SW5 closed, the control unit U4 outputs to the signal transmission component a command signal to let the lamp exit the timing operation mode, then the signal transmission component sends the command signal to the lamp power source F, and the lamp power source F controls the lamp G to exit the timing operation mode.

Another method for the second selection switch SW2 to cooperate with the control unit U4 is that: when the user makes the second selection switch SW2 closed for the first time, the control unit U4 selects the timing switch mode and meanwhile outputs a timing switch signal to the signal transmission component. Subsequently, the timing mode can be switched by the second selection switch SW2 or the switch element SW5.

The operation mode selection unit includes a fourth selection switch SW4 configured to cooperate with the control unit U4 and enable the control unit U4 to select a lamp dimming switch mode and/or output a dimming switch signal. The fourth selection switch SW4 preferably employs a button switch, which has the same characteristics as the button switch employed by the first selection switch SW1. Dimming refers to adjustment of brightness and color temperature of the lamp G. One end of the fourth selection switch SW4 is connected to a third pin of the control unit U4, while another end thereof is grounded. When the fourth selection switch SW4 is closed, a low level is generated at the third pin of the control unit U4. To avoid short circuit caused by pressing of other selection switches while pressing the fourth selection switch SW4, preferably, a third resistor R3 is connected between one end of the fourth selection switch SW4 and the third pin of the control unit U4.

By changing the output current of the lamp power source F, the brightness or color temperature of the lamp G can be changed. Multiple output currents of different magnitudes can be arranged in the lamp power source F as needed. When the fourth selection switch SW4 is pressed for the first time to be closed, a low-level signal is generated at the third pin of the control unit U4. In the case that the control unit U4 selects the lamp dimming switch mode, when the user makes the fourth selection switch SW4 connected for the second time or when the user shakes or waves the magic remote control for the first time to make the switch element SW5 closed, the control unit U4 outputs to the signal transmission component a command signal to switch the lamp into a first brightness or color temperature, then the signal transmission component sends the command signal to the lamp power source F, and the lamp power source F controls the lamp G to switch into the first brightness or color temperature. When the user makes the fourth selection switch SW4 connected for the third time, or when the user shakes or waves the magic remote control for the second time to make the switch element SW5 closed, the control unit U4 outputs to the signal transmission component a command signal to switch the lamp into a second brightness or color temperature, then the signal transmission component sends the command signal to the lamp power source F, and the lamp power source F controls the lamp G to switch into the second brightness or color temperature. Supposing there are four brightness or color temperature switching modes in the lamp power source F, after the fourth selection switch SW4 has been closed once, every time the user shakes or waves the magic remote control, the brightness or color temperature is switched once, allowing cyclic switching between four brightness or color temperature switching modes.

Another method for the fourth selection switch SW4 to cooperate with the control unit U4 is that: when the user makes the fourth selection switch SW4 closed for the first time, the control unit U4 selects the lamp dimming switch mode and meanwhile outputs a dimming switch signal; if subsequently the user shakes or waves the magic remote control to make the switch element SW5 closed or makes the fourth selection switch SW4 closed again, the control unit U4 outputs a dimming switch signal.

The signal transmission component includes a signal modulation circuit, a bandpass circuit and a transmitting antenna U5. An input end of the signal modulation circuit is connected to an output end of the control unit U4. An input end of the bandpass circuit is connected to an output end of the signal modulation circuit. An output end of the bandpass circuit is connected to the transmitting antenna U5.

The signal modulation circuit includes a frequency signal modulation chip U2, a fourth capacitor C4, an eighth capacitor C8 and a crystal oscillator X1. A fourth pin of the frequency signal modulation chip U2 is connected to a seventh pin of the control unit U4. A fifth pin of the frequency signal modulation chip U2, one end of the fourth capacitor C4 and one end of the eighth capacitor C8 are all connected to the positive electrode of the storage battery U1 in the power supply unit, while another end of the fourth capacitor C4 and another end of the eighth capacitor C8 are grounded. A sixth pin of the frequency signal modulation chip U2 is connected to the crystal oscillator X1, and meanwhile the crystal oscillator X1 is grounded too. Both first and second pins of the frequency signal modulation chip U2 are grounded, and a third pin of the frequency signal modulation chip U2 is connected to the bandpass circuit.

The bandpass circuit includes a fourth inductor L4, a first capacitor C1, a first inductor L1, a third capacitor C3, a second inductor L2, a sixth capacitor C6, a third inductor L3 and a seventh capacitor C7. The power supply unit further includes a ninth resistor R9. One end of the ninth resistor R9 is connected to the positive electrode of the storage battery U1 in the power supply unit, while another end of the ninth resistor R9 is connected to one end of the fourth inductor L4. One end of the first capacitor C1 is connected to another end of the fourth inductor L4 and the third pin of the frequency signal modulation chip U2 in the signal modulation circuit respectively, while another end of the first capacitor C1 is connected to one end of the first inductor L1. One end of the third capacitor C3 and one end of the second inductor L2 are both connected to another end of the first inductor L1, while another end of the third capacitor C3 is grounded. One end of the sixth capacitor C6 and one end of the third inductor L3 are both connected to another end of the second inductor L2, while another end of the sixth capacitor C6 is grounded. One end of the seventh capacitor C7 and the transmitting antenna U5 are both connected to another end of the third inductor L3, while another end of the seventh capacitor C7 is grounded.

The control circuit in the present embodiment further includes a light indication unit configured to indicate that the remote signal switch component C sends a remote signal. The light indication unit includes a first resistor R1, a first switch transistor Q1, a second resistor R2 and an indicator LED1. One end of the first resistor R1 is connected to an output end (a fifth pin) of the control unit U4. The first switch transistor Q1 preferably employs a triode. Another end of the first resistor R1 is connected to the base of the first switch transistor Q1. The emitter of the first switch transistor Q1 is grounded, and the collector of the first switch transistor Q1 is connected to one end of the second resistor R2. Another end of the second resistor R2 is connected to one end of the indicator LED1. Another end of the indicator LED1 is connected to the storage battery U1 in the power supply unit. When the fifth pin of the control unit U4 outputs a signal, the signal passes through the first resistor R1 for current limiting and then reaches the base to turn on the first switch transistor Q1. The current flows through the indicator LED1, the second resistor R2 and the first switch transistor Q1 to the ground, whereby the indicator LED1 is lit on. The indicator LED1 can be installed inside the ornament A2, which is made of transparent materials and can protect and support the indicator LED1.

Embodiment 2

Figure 3:
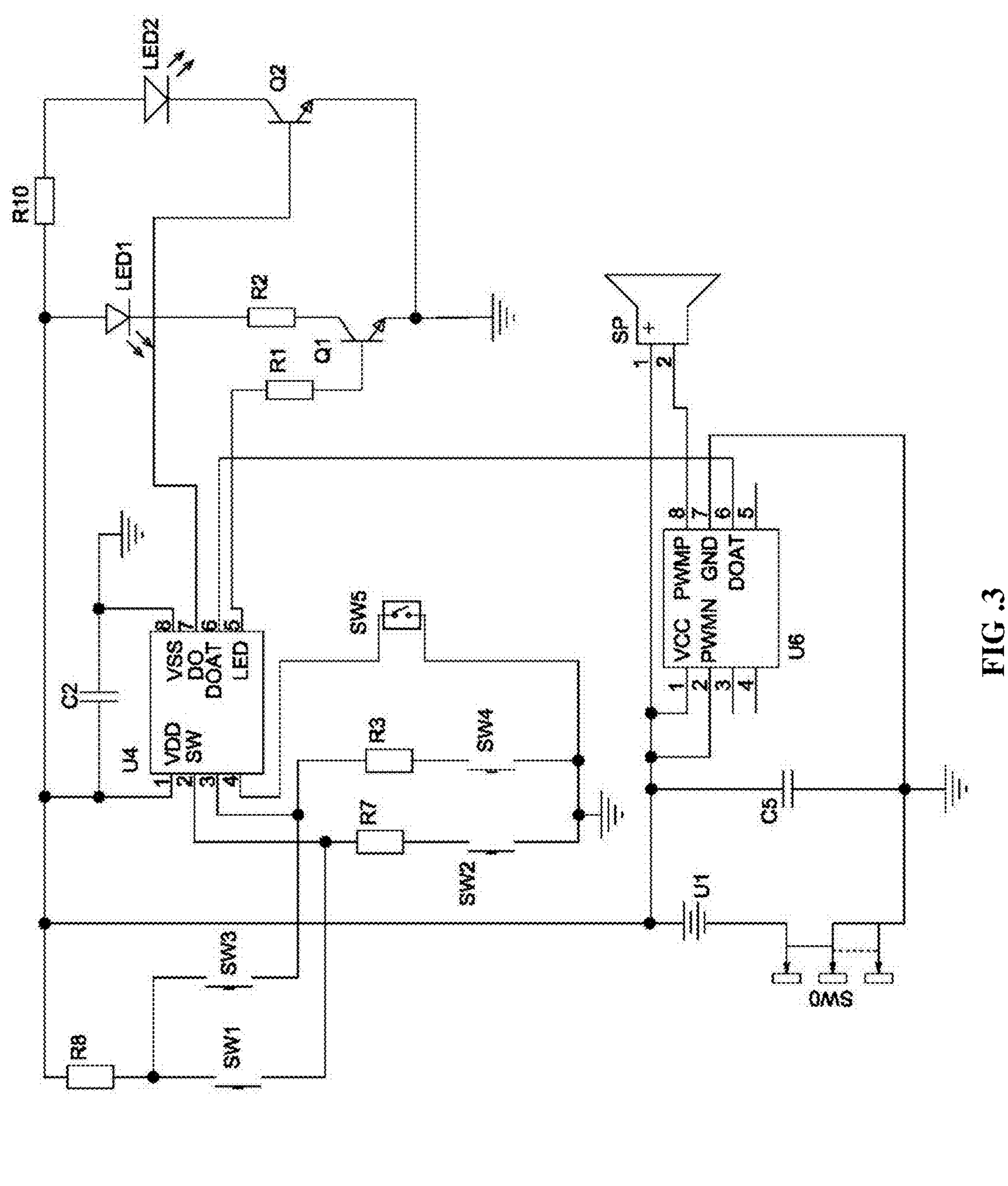
FIG. 3 is a schematic diagram of a second control circuit.

The signal transmission component in the present embodiment is different from that in Embodiment 1. Specifically, as shown in FIG. 3, the signal transmission component in the present embodiment includes a second switch transistor Q2 and an infrared emitting diode LED2. The second switch transistor Q2 is connected to an output end of the control unit U4, and the infrared emitting diode LED2 is connected to the power supply unit and the second switch transistor Q2 respectively. The second switch transistor Q2 preferably employs a triode. The base of the second switch transistor Q2 is connected to a seventh pin of the control unit U4. The emitter of the second switch transistor Q2 is grounded. The collector of the second switch transistor Q2 is connected to the power supply unit. Preferably, the power supply unit further includes a current limiting resistor R10. One end of the current limiting resistor R10 is connected to the positive electrode of the storage battery U1, while another end thereof is connected to the collector of the second switch transistor Q2.

Embodiment 3

Figure 4:
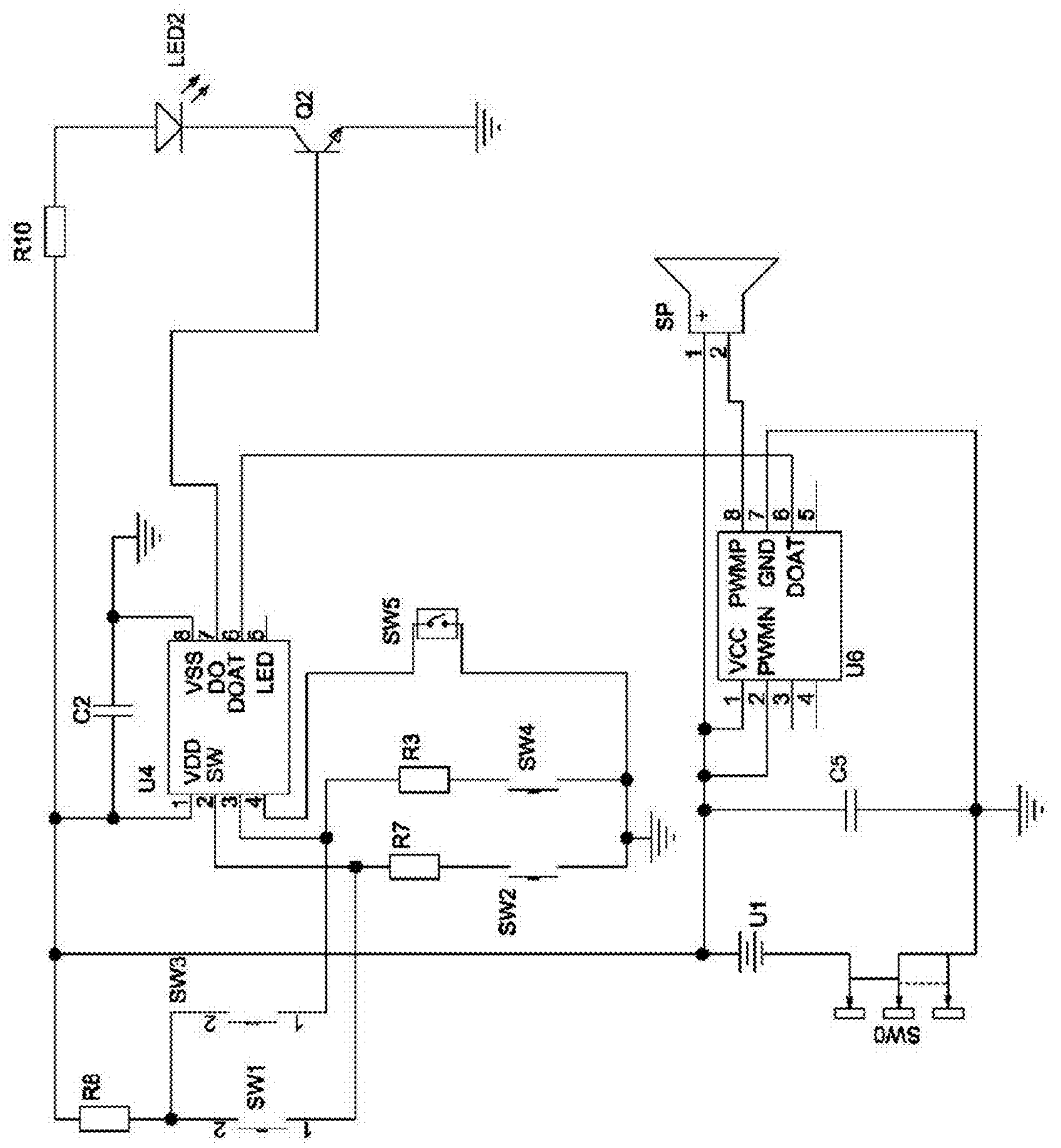
FIG. 4 is a schematic diagram of a third control circuit.

The present embodiment is different from Embodiment 2 in that: as shown in FIG. 4, in the present embodiment there is no light indication unit composed of a first resistor R1, a first switch transistor Q1, a second resistor R2 and an indicator LED1. Since the infrared emitting diode LED2 can emit light during operation, the infrared emitting diode LED2 (model MYS-IR3199 W-M4 (R+IR)) can serve as both a signal transmission device and an indicator.

Besides the above embodiments, the remote signal switch component C can also be composed of the operation mode selection unit. The operation mode selection unit is any one or more of the first selection switch SW to the fourth selection switch SW4. When the control unit U4 receives an input signal from the operation mode selection unit, the control unit U4 outputs a control command to the signal transmission component. In this case, since the remote signal switch component C includes the operation mode selection unit, a first installation hole 2 is formed on the shell A, and the operation mode selection unit passes through the first installation hole 2.

When the remote signal switch component C includes only the switch element SW5, since the switch element SW5 is a vibration switch, a signal can be sent by the switch element SW5. In this case, since the remote signal switch component C does not include the operation mode selection unit, it is unnecessary to form a first installation hole 2 on the shell A. By shaking the switch element SW5, a signal, for example, for turning on or off the lamp can be sent out.

Figure 5:
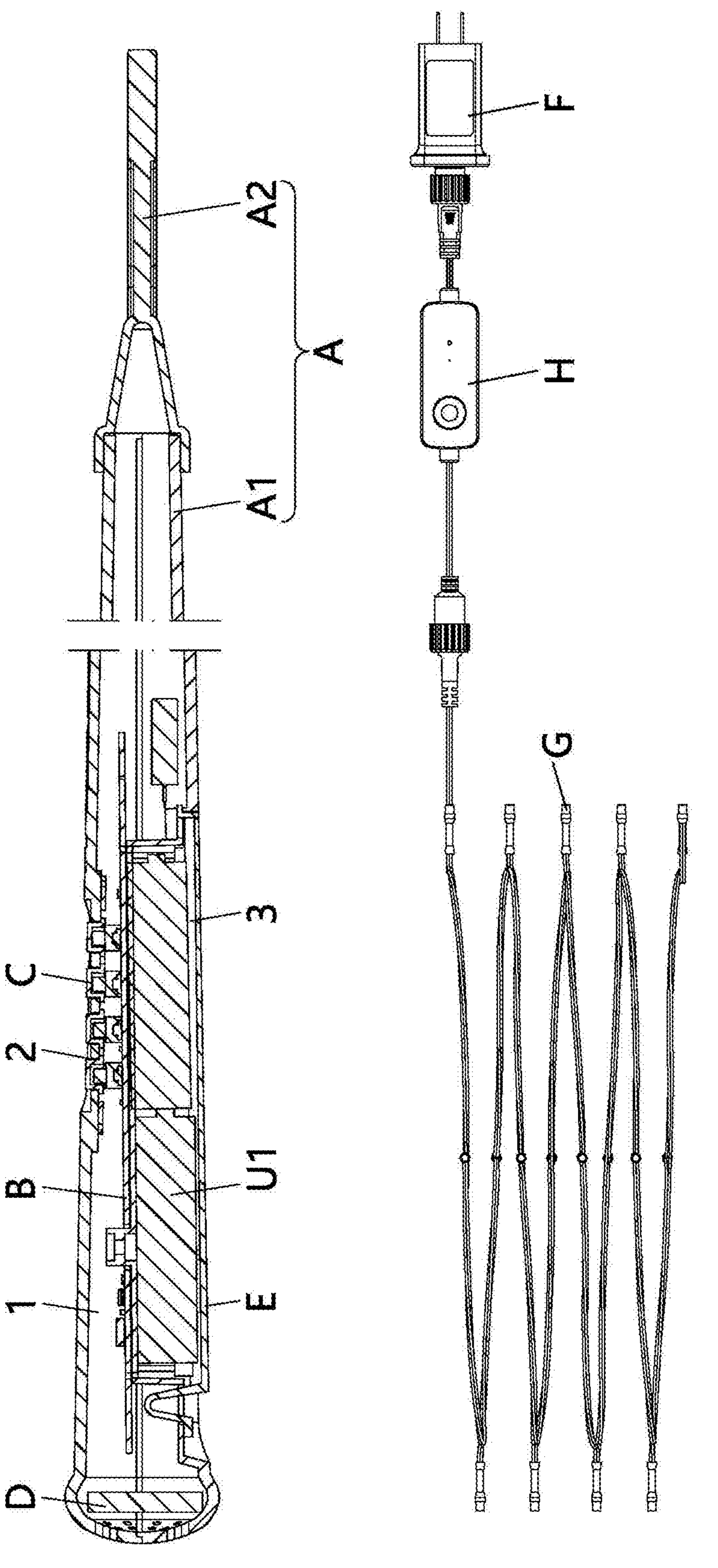
FIG. 5 is a diagram of a second magic remote control for a lamp and a lamp power source.

As shown in FIG. 5, the lamp power source F can employ one having an infrared remote signal or radio frequency remote signal receiver. In the present embodiment, a separate controller H is provided. An input end of the separate controller H is connected to an output end of the lamp power source F, while an output end of the separate controller H is connected to the lamp G. The structures of the separate controller H, the lamp power source F and the lamp G are of existing technologies. When the lamp power source F receives a signal sent from the magic remote control, the lamp power source F outputs the signal to the separate controller H, which then controls the lighting effect or status of the lamp G. The separate controller H is provided with an extra operating button, which can be used to control the lighting effect or status of the lamp G as well.

What is claimed is:

1. A magic remote control for a lamp, comprising a shell (A), a circuit board (B), a remote signal switch component (C) and a power supply unit, the shell (A) being formed with a first cavity (1), the circuit board (B) being located inside the first cavity (1) and fixed to the shell (A), the circuit board (B) being provided with a control circuit, the control circuit comprising a control unit (U4) and a signal transmission component, the power supply unit being connected to the control unit (U4), the remote signal switch component (C) being connected to the control unit (U4), and the signal transmission component being connected to the control unit (U4), wherein the control unit (U4) is configured to output a lamp operation mode change signal and an audio playback command after receiving a switch signal provided by the remote signal switch component (C);

further comprising an audio unit (D) configured to play an audio according to the audio playback command from the control unit (U4), the audio unit being connected to the control unit (U4);

the signal transmission component comprises a signal modulation circuit, a bandpass circuit and a transmitting antenna (U5), the signal modulation circuit being connected to the control unit (U4), the bandpass circuit being connected to the signal modulation circuit, and the bandpass circuit being connected to the transmitting antenna (U5); and the bandpass circuit comprises a fourth inductor (L4), a first capacitor (C1), a first inductor (L1), a third capacitor (C3), a second inductor (L2), a sixth capacitor (C6), a third inductor (L3) and a seventh capacitor (C7); wherein one end of the fourth inductor (L4) is connected to the power supply unit; wherein one end of the first capacitor (C1) is connected to another end of the fourth inductor (L4) and the signal modulation circuit respectively, while another end of the first capacitor (C1) is connected to one end of the first inductor (L1); wherein one end of the third capacitor (C3) and one end of the second inductor (L2) are both connected to another end of the first inductor (L1), while another end of the third capacitor (C3) is grounded; wherein one end of the sixth capacitor (C6) and one end of the third inductor (L3) are both connected to another end of the second inductor (L2), while another end of the sixth capacitor (C6) is grounded; and wherein one end of the seventh capacitor (C7) and the transmitting antenna (U5) are both connected to another end of the third inductor (L3), while another end of the seventh capacitor (C7) is grounded.

2. The magic remote control for a lamp according to claim 1, wherein the control circuit further comprises a light indication unit configured to indicate that the remote signal switch component (C) sends a remote signal, the light indication unit comprising a first switch transistor (Q1) and an indicator (LED1), one end of the first switch transistor (Q1) being connected to the control unit (U4), and the indicator (LED1) being connected to the first switch transistor (Q1) and the power supply unit respectively.

3. The magic remote control for a lamp according to claim 1, wherein the remote signal switch component (C) comprises: an operation mode selection unit configured to cooperate with the control unit (U4) and enable the control unit (U4) to select a lamp control mode and/or output a lamp operation state switch signal; and/or a switch element (SW5) configured to cooperate with the control unit (U4) and enable the control unit (U4) to output a lamp operation state switch signal, the operation mode selection unit being connected to the control unit (U4), one end of the switch element (SW5) being connected to the control unit (U4) while another end thereof being grounded.

4. The magic remote control for a lamp according to claim 3, wherein the operation mode selection unit comprises a first selection switch (SW1) configured to cooperate with the control unit (U4) and enable the control unit (U4) to select a lamp On-Off switch mode and/or output a lamp On-Off switch signal or turn on or off the magic remote control, one end of the first selection switch (SW1) being connected to the power supply unit while another end thereof being connected to the control unit (U4).

5. The magic remote control for a lamp according to claim 3, wherein the operation mode selection unit comprises a third selection switch (SW3) configured to cooperate with the control unit (U4) and enable the control unit (U4) to select a flashing switch mode and/or output a flashing switch signal, one end of the third selection switch (SW3) being connected to the power supply unit while another end thereof being connected to the control unit (U4).

6. The magic remote control for a lamp according to claim 3, wherein the operation mode selection unit comprises a second selection switch (SW2) configured to cooperate with the control unit (U4) and enable the control unit (U4) to select a timing switch mode and/or output a timing switch signal, one end of the second selection switch (SW2) being connected to the control unit (U4) while another end thereof being grounded.

7. The magic remote control for a lamp according to claim 3, wherein the operation mode selection unit comprises a fourth selection switch (SW4) configured to cooperate with the control unit (U4) and enable the control unit (U4) to select a lamp dimming switch mode and/or output a dimming switch signal, one end of the fourth selection switch (SW4) being connected to the control unit (U4) while another end thereof being grounded.

8. The magic remote control for a lamp according to claim 3, wherein the switch element (SW5) is a vibration sensor.

9. The magic remote control for a lamp according to claim 1, wherein the audio unit comprises an audio storage chip (U6) and a speaker (SP), the audio storage chip (U6) being connected to the power supply unit, the audio storage chip (U6) being connected to the control unit (U4), the speaker (SP) being connected to the power supply unit, and the speaker (SP) being further connected to the audio storage chip (U6).

10. The magic remote control for a lamp according to claim 1, wherein the signal transmission component comprises a second switch transistor (Q2) and an infrared emitting diode (LED2), the second switch transistor (Q2) being connected to the control unit (U4), and the infrared emitting diode (LED2) being connected to the power supply unit and the second switch transistor (Q2) respectively.

* * * * *